UNITED STATES PATENT OFFICE.

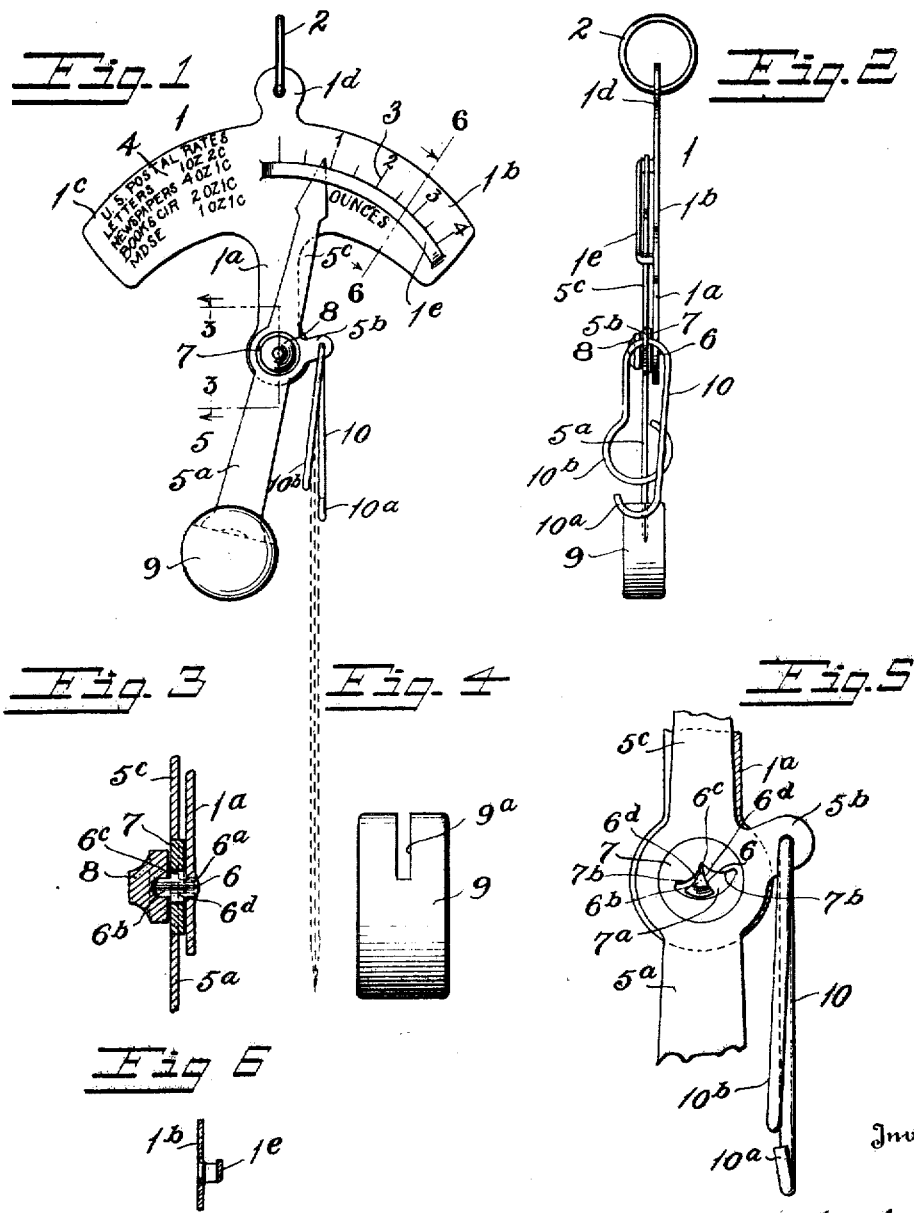

WILLIAM A. HYDE, OF CAMBRIDGE, MASSACHUSETTS.

POSTAL SCALE.

1,367,972. Specification of Letters Patent. Patented Feb. 8, 1921.

Application filed November 14, 1916. Serial No. 131,190.

*To all whom it may concern:*

Be it known that I, WILLIAM A. HYDE, a citizen of the United States, residing at Cambridge, in the county of Middlesex and State of Massachusetts, have invented certain new and useful Improvements in Postal Scales, of which the following is a specification.

The invention, as the title indicates, relates to scales especially adapted to the weighing of letters and other pieces of mail matter. The object of the invention, generally stated, is the production of a scale of the character indicated which can be manufactured at small cost but which is highly accurate without the necessity of adjustment, and which is very simple, durable, compact, light, convenient in use, and pleasing in appearance. The nature of the improvements and a preferred form of construction for attaining the foregoing object will be set forth in detail in the following description in connection with the accompanying drawings.

In the drawing,

Figure 1 is a front elevation of the scale;

Fig. 2 is a side elevation of the same;

Fig. 3 is an enlarged fragmentary section taken on the line 3—3 of Fig. 1;

Fig. 4 is an enlarged side elevation of the beam weight showing its form prior to attachment;

Fig. 5 is a fragmentary front elevation of a portion of the scale with one of the parts removed to show the knife edge construction;

Fig. 6 is a section taken on the line 6—6 of Fig. 1.

Referring in detail to the construction illustrated, 1 is a support formed from sheet metal and having a vertical stem part $1^a$ and oppositely arranged laterally extending arms $1^b$ and $1^c$ which are preferably arcuate, as shown. At its upper end the support has an apertured extension $1^d$ in which is loosely secured a suspension ring 2.

One arm of the support, preferably the right arm $1^b$, has an arcuate strip of its metal struck up to form a guard or keeper $1^e$, the purpose of which will presently appear. Above the guard $1^e$ the arm $1^b$ carries a graduated scale of weights which is indicated by the numeral 3, this scale extending from about the vertical median line or plane of the support toward the right.

On the opposite side of said median line, that is, on the left arm $1^c$ of the support, is a table of postal rates designated by the numeral 4.

To the lower end of the stem $1^a$ of the support is pivotally secured a beam 5. The beam has a long depending counterweight arm $5^a$, a laterally extending short load arm $5^b$ and an upwardly extending pointer or indicator arm $5^c$, said beam being preferably stamped from a single piece of sheet metal. The pivotal connection between the beam and the support consists essentially of a knife edge pivot stud 6 of hardened steel which is rigidly secured to the lower end of the stem $1^a$ of the support, and a disk 7 which may be and preferably is of hardened steel and which is secured to the beam and suitably apertured to receive the knife edge stud.

Scales of the general character of that herein set forth have heretofore been proposed but, as far as I am aware, all of said proposed scales have had their beams supported on plain cylindrical pivots. I have found that it is impossible to commercially propose a scale with a pivotal support of this latter character sufficiently accurate to meet the tests and requirements to which such scales are subjected. On the other hand, the provision of a knife edge pivotal support for scales of this character has presented serious difficulties not only on account of the cost of producing a satisfactory knife edge construction but also by reason of the relatively wide swing of the scale beam which is necessary in a scale of the pendulum type. In the construction shown I have fully overcome these difficulties and will now refer in further detail to the pivot parts.

The pivot stud 6, which is made from round steel rod, has one end reduced as at $6^a$ to enter an aperture in the lower end of the stem $1^a$ of the support, while its opposite end part is reduced as at $6^b$ to enter a head or cap 8 which is suitably drilled out to receive it. On the middle part of the stud is formed the knife edge $6^c$, preferably by milling away the opposite sides of the stud which is thus formed with opposite concave sides $6^d$, $6^d$. By thus forming the stud I secure at its upper side a very thin knife edge and at its lower side a thick body of metal which insures ample strength and permits the reduced end parts $6^a$, $6^b$ to be made of substantial dimensions.

The female member 7 of the pivot connection is preferably in the form of a cylindrical disk of hardened steel which is made with an aperture 7ª of a form especially designed to coöperate with the peculiarly formed knife edge. That is to say, the two upper sides 7ᵇ, 7ᵇ of the aperture are convexly shaped to conform to the adjacent concave sides of the knife edge stud, while the lower side of the aperture is preferably formed on a circle struck about the intersection of the sides 7ᵇ, 7ᵇ, said intersection forming the saddle which rests upon the knife edge. This knife edge saddle is eccentric with respect to the center of the insert 7 and the axis of the pivot stud, a feature having a purpose which will presently appear.

With the two parts of the knife edge support thus formed, I secure great strength and rigidity for the stud by reason of the great width of its lower part, and, at the same time, provide for an adequate swing of the beam without making the angular opening of the aperture at the saddle large enough to permit the latter to slip off the knife edge when the beam is swung to its extreme limit. The maximum angular opening of the aperture at the saddle which is feasible may be taken as 90° and I have found it possible by the use of my improved construction to provide a stud of practical dimensions having a knife edge proper of 10°, allowing for a beam swing of 60° and for an additional clearance on each side of the stud of 7½°, thus making a total of only 85° angular opening at the saddle so that the displacement of the knife edge from the saddle is entirely obviated while an ample swing of the beam is secured.

When the pivot stud 6 and the disk 7 have been formed, as described, they are suitably case hardened so that wear between the engaging knife edge parts is practically wholly obviated, and the scale is rendered highly sensitive.

The knife edge stud 6 is preferably secured in the arm 1ª by the operation of a spinning riveter which rivets the metal of the arm on and around the stud in a manner understood by those familiar with metal work of this character. As shown in Fig. 3 the cylindrical disk 7 is made thicker than the metal of the beam 5 so as to afford a working clearance between the beam and the support. The insert 7 is preferably secured to the beam by giving it a forced fit in a circular aperture previously formed in the beam so that it is securely held and yet is capable of angular adjustment. The beam is operatively secured in position on the pivot stud by means of the head 8 which is drilled out to receive the front end of the stud and is preferably secured by a forced fit.

The utility of my improved knife-edge pivot is obviously not dependent upon the specific form of the other features of the scale illustrated, and it will be understood that substitution for said features of equivalent forms of construction, such for example as a spring for a counterweight, can be made in so far as the knife edge support is concerned.

The weight arm 5ª of the beam carries at its lower end a counterweight 9. In the preferred construction this weight is in the form of a cylindrical block formed in its upper side with a slot 9ª to receive the lower end of the beam arm 5ª. The bottom of the said slot 9ª is straight and the end of the beam arm is formed with relatively widely separated bearing points to engage the straight surface at the bottom of the slot in the weight so that the latter can be quickly and accurately positioned on the beam arm. When it has been thus positioned it is secured by stamping the metal adjacent the slot down upon the weight arm so that the latter is very firmly clamped and the weight thus secured.

To the free end of the load arm 5ᵇ is loosely connected a load holder 10 which may be of any suitable construction, but is preferably in the form of a combined spring clip and hook, as shown. It will be observed that the hook 10ª of the load holder is formed on the longer end thereof while the other shorter end of the load holder terminates in a widened circle 10ᵇ, one side of which presses against the other end of the holder to form coöperating parts of the clip while the other side overlies the end of the hook 10ª so that the latter is effectively guarded and prevented from catching in things and yet is readily available for its intended use.

The indicator arm 5ᶜ of the beam, as previously indicated, is designed to coöperate with the scale of weights 3 on the right arm of the support 1. When the parts of the scale are assembled, the upper, pointer end of the arm 5ᶜ extends between the arm 1ᵇ of the support and the guard 1ᵉ, as indicated in Fig. 1, so that the swinging movement of the beam is limited to correspond to the scale of weights 3 and it is impossible for the beam to get in an inoperative position in relation to the support. This not only insures convenience in the use of the scale, but prevents the pointer from becoming displaced and being accidentally caught and bent.

I have already referred to the fact that the knife edge saddle is eccentric with respect to the center of the circular steel disk 7. By virtue of this fact I am enabled, when the beam is assembled on the support, to readily adjust the effective length of the load arm 5ᵇ to take account of any slight inaccuracy in manufacture and insure an absolutely accurate reading of the scale. This adjustment is effected by simply turning the disk 7 in the beam, this being readily accomplished by inserting a suitable tool in the aperture of the disk so that the latter can be turned in relation to the beam.

The manner of using the scale will be readily understood without a detail description. The position of the beam when loaded is shown in Fig. 1. When the scale is unloaded the weight arm 5ª hangs pendulum-like from the pivot stud 6 while the pointer is at zero on the graduated scale of weights. The letter, or other article to be weighed, is attached to the holder 10 and, the scale being held by the suspending ring 2, the pointer, moving with the beam, indicates the weight of the article; then the user, by glancing at the table of weights on the left arm of the support, notes the postage required. The arrangement of the graduated scale of weights and of the table of rates in the spaces directly opposite each other, is found to render the reading of the scale exceedingly easy and convenient, especially as both the graduated scale and the table of rates are upon the stationary support. Furthermore, this arrangement lends itself to a symmetrical form of construction, such as illustrated, and the symmetry of the parts gives the scale a very pleasing appearance.

In Fig. 1 a letter is indicated (by dotted lines) as inserted in the holder clip. It will, of course, be understood that when a package or other article of bulk is to be weighed it can be attached to the hook 10ª of the load holder.

A construction such as I have herein set forth lends itself admirably to machine methods of manufacture which insure both a high degree of accuracy and a minimum cost of production, thus the support 1, the beam 5 and the steel disk 7 can be stamped and formed from sheet metal, accurate die stampings of this character being readily produced. Again, the knife edge pivot stud 6, as well as its head or cap 8, lends itself to automatic or semiautomatic machine operations and can be rapidly produced from round rod stock. The weight 9, too, lends itself to rapid production from round rod stock by suitable specially designed machine tools.

As stated above, such methods of production insure accuracy as well as cheapness, but the effect of any slight inaccuracy in the production of the parts of the scale is overcome by the adjustment of the pivot disk 7 as set forth above.

Various modifications in the form and arrangement of the parts may be resorted to without departing from the broader features of the invention, and it will be understood that the constructions shown in the drawings and the foregoing description thereof are for the purpose of illustration and explanation and in no sense intended to limit the invention.

What I claim is:—

1. In a weighing apparatus, the combination of a support carrying a graduated scale of weights, an elongated keeper on the support extending approximately parallel to the scale of weights, and a beam comprising a load arm, a counterweight arm and an elongated pointer arm, said beam being pivotally mounted on the support with the pointer arm extending between the body of the support and said keeper in coöperative relation with the graduated scale of weights.

2. In a weighing apparatus, the combination of a sheet metal support carrying a graduated scale of weights and formed with an integral elongated guard extending approximately parallel to the said scale of weights, and a sheet metal beam comprising a load arm, a counterweight arm and an elongated pointer arm, said beam being pivotally mounted on the support with the pointer arm extending between the body of the support and the keeper in coöperative relation with the graduated scale of weights.

3. In a weighing apparatus, the combination of a sheet metal support carrying a graduated scale of weights and formed with keeper means struck up from the metal of the support, and a sheet metal beam having a load arm, a counterweight arm and a pointer, said beam being pivotally mounted on the support with the pointer in coöperative relation with the graduated scale of weights and between parts of the keeper means which serve to limit the swing of the pointer and beam.

4. In a weighing apparatus, the combination of a support of sheet metal carrying a graduated scale of weights and formed with an elongated keeper struck up from the metal of the support and attached thereto at its ends only, and a beam comprising a load arm, a counterweight arm and a weight indicating arm, said beam being pivotally mounted on the support with the weight indicating arm extending between the body of the support and the keeper in coöperative relation with the scale of weights on the support.

5. In a weighing apparatus, the combination of a support carrying a graduated scale of weights, a beam having a load arm, a counterweight arm and an index adapted to coöperate with the graduated scale of weights, and a pivotal connection between the beam and the support comprising a knife edge pivot stud with concave sides secured to one of the two members mentioned and a part carried by the other of the two members and formed with an aperture for the stud having convex sides adjacent the concave sides of the stud and forming at their intersection a saddle for the knife edge.

6. In a weighing apparatus, the combination of a sheet metal support carrying a graduated scale of weights, a beam of sheet metal having a load arm, a counterweight arm and an index to coöperate with the scale of weights, and a pivotal connection between said two parts comprising a knife edge stud secured in one of said parts and a disk inserted in the other part, said disk being apertured to form a saddle for the knife edge and being thicker than the part in which it is mounted to space said part from the other said part and insure a working clearance between them.

7. In a weighing apparatus, the combination of a support carrying a graduated scale of weights, a beam having a load arm, a counterweight arm and an index, and means pivotally connecting the beam to the support comprising a knife edge carried by one of the two members mentioned and a saddle for the knife edge carried by the other of said members, one of the two knife edge pivot parts being adjustable about an axis of rotation to vary the effective length of one of the arms of the beam.

8. In a weighing apparatus, the combination of a support carrying a graduated scale of weights, a beam having a load arm, a counterweight arm and an index, and a pivotal connection between the beam and support comprising a pivot stud formed with a knife edge and secured to one of the two members mentioned and a circular disk formed with an aperture for the knife edge stud, with a saddle for the knife edge eccentric with respect to the periphery of the disk, said disk being rotatably adjustably secured to the other of the first two members mentioned and adapted when adjusted to vary the effective length of one of the beam arms.

9. In a weighing apparatus, the combination of a support carrying a graduated scale of weights, a beam having a laterally extending load arm, a depending counterweight arm and an index to coöperate with the graduated scale of weights, and a pivotal connection between the beam and the support comprising a stud secured to the support and formed with a knife edge and a circular disk formed with an aperture for the knife edge stud with a saddle for the knife edge eccentric with respect to the periphery of the disk, said circular disk being rotatably adjustably secured in the beam and adapted when adjusted to vary the effective length of the load arm of the beam.

10. In a weighing apparatus, the combination of a support of relatively soft sheet metal, a beam also of relatively soft sheet metal and a pivotal connection between the support and beam comprising a pivot stud of hardened steel secured in an aperture in the support by riveting the metal of the support about the stud and a hardened steel member apertured to receive the pivot stud and secured in an aperture in the beam with a forced fit.

11. In a weighing apparatus, the combination of a support, a flat sheet metal beam pivotally mounted on the support, said beam having a load arm and a counterweight arm, and an integral weight formed with a slot which embraces the free end of the said counterweight arm with its bottom engaging the end of the arm to accurately space the weight from the beam pivot and its sides tightly clamping the sides of the arm to rigidly secure the weight thereto.

12. In a weighing apparatus, the combination of a support, a beam pivotally mounted on the support and having a load arm and a counterweight arm, and a depending load holder pivotally connected to the load arm, said holder having a hook at its lower end and a spring clip above the hook with parts that overlie and guard the free end of the hook.

13. In a weighing apparatus, the combination, of a support, a beam pivotally mounted on the support and having a load arm and a counterweight arm, and a depending load holder pivotally connected to the load arm, the said holder being made of a resilient wire bent upon itself to form two depending arms one of which is shaped at its lower end to form a hook while the other is formed with a loop that bears against the first arm and overlies and guards the free end of the said hook.

In testimony whereof I affix my signature.

WILLIAM A. HYDE.